(12) United States Patent
Curnyn

(10) Patent No.: US 9,294,487 B2
(45) Date of Patent: Mar. 22, 2016

(54) METHOD AND APPARATUS FOR PROVIDING NETWORK SECURITY

(75) Inventor: Jon Curnyn, Buckinghamshire (GB)

(73) Assignee: BAE SYSTEMS PLC, London (GB)

(*) Notice: Subject to any disclaimer, the term of this patent is extended or adjusted under 35 U.S.C. 154(b) by 1021 days.

(21) Appl. No.: 12/282,329

(22) PCT Filed: Mar. 14, 2007

(86) PCT No.: PCT/GB2007/000892
§ 371 (c)(1),
(2), (4) Date: Nov. 10, 2008

(87) PCT Pub. No.: WO2007/104980
PCT Pub. Date: Sep. 20, 2007

(65) Prior Publication Data
US 2009/0307769 A1    Dec. 10, 2009

(30) Foreign Application Priority Data

Mar. 14, 2006 (GB) .................................. 0605119.7

(51) Int. Cl.
*G06F 21/56* (2013.01)
*H04L 29/06* (2006.01)

(52) U.S. Cl.
CPC .......... *H04L 63/1408* (2013.01); *G06F 21/566* (2013.01); *H04L 63/1441* (2013.01)

(58) Field of Classification Search
CPC . H04L 63/0245; H04L 63/145; H04L 12/585; H04L 12/5855; H04L 51/12; H04L 63/02; H04L 63/1416

USPC .......................................... 726/11–14, 22–24
See application file for complete search history.

(56) References Cited

U.S. PATENT DOCUMENTS

| | | | |
|---|---|---|---|
| 6,654,373 B1* | 11/2003 | Maher, III et al. ............ | 370/392 |
| 6,889,209 B1* | 5/2005 | Rabin et al. ..................... | 705/57 |
| 6,925,572 B1* | 8/2005 | Amit et al. ....................... | 726/15 |
| 6,993,660 B1* | 1/2006 | Libenzi et al. ................. | 713/188 |
| 7,370,352 B2* | 5/2008 | Minnick .......................... | 726/11 |
| 7,584,228 B1* | 9/2009 | Protassov et al. | |
| 7,805,392 B1* | 9/2010 | Steele et al. .................... | 706/48 |
| 7,836,499 B1* | 11/2010 | Hernacki et al. ................ | 726/22 |
| 7,937,761 B1* | 5/2011 | Bennett ............................ | 726/23 |
| 7,992,206 B1* | 8/2011 | Painter et al. ................... | 726/23 |
| 2002/0033844 A1* | 3/2002 | Levy et al. ..................... | 345/744 |
| 2002/0178381 A1* | 11/2002 | Lee et al. ....................... | 713/201 |
| 2003/0046585 A1* | 3/2003 | Minnick ........................ | 713/201 |
| 2003/0055903 A1* | 3/2003 | Freed ............................ | 709/206 |
| 2003/0110379 A1* | 6/2003 | Ylonen et al. ................. | 713/164 |

(Continued)

FOREIGN PATENT DOCUMENTS

| | | | | |
|---|---|---|---|---|
| GB | 2 416 891 A | | 2/2006 | |
| GB | 2416891 A | * | 2/2006 | ............. H04L 29/06 |

(Continued)

*Primary Examiner* — Jason K. Gee
*Assistant Examiner* — Zhimei Zhu
(74) *Attorney, Agent, or Firm* — Scully, Scott, Murphy & Presser, P.C.

(57) ABSTRACT

The invention relates to the provision of virus scanning capabilities in a network environment. Optimum use is made of a plurality of virus scanners by inspecting content passed over the network to identify which of the scanners is most suitable for that content. The content is then passed to the appropriate scanners in dependence on the results of the inspection.

20 Claims, 4 Drawing Sheets

(56) References Cited

U.S. PATENT DOCUMENTS

| | | | |
|---|---|---|---|
| 2004/0037299 A1* | 2/2004 | Pandya | 370/401 |
| 2004/0107345 A1* | 6/2004 | Brandt et al. | 713/171 |
| 2004/0111465 A1* | 6/2004 | Chuang et al. | 709/203 |
| 2004/0181687 A1* | 9/2004 | Nachenberg et al. | 713/201 |
| 2005/0055399 A1* | 3/2005 | Savchuk | 709/203 |
| 2005/0210294 A1* | 9/2005 | Amit et al. | 713/201 |
| 2005/0235154 A1* | 10/2005 | Serret-Avila | 713/176 |
| 2005/0286535 A1* | 12/2005 | Shrum et al. | 370/395.21 |
| 2006/0053295 A1* | 3/2006 | Madhusudan et al. | 713/181 |
| 2006/0095588 A1* | 5/2006 | Van Lunteren | 709/246 |
| 2006/0130141 A1* | 6/2006 | Kramer et al. | 726/23 |
| 2006/0150176 A1* | 7/2006 | Dorricott et al. | 717/168 |
| 2006/0174343 A1* | 8/2006 | Duthie et al. | 726/23 |
| 2006/0195451 A1* | 8/2006 | Smith et al. | 707/10 |
| 2006/0206728 A1* | 9/2006 | Masuda | 713/193 |
| 2006/0236370 A1* | 10/2006 | John et al. | 726/1 |
| 2006/0253908 A1* | 11/2006 | Yang | 726/24 |
| 2006/0268914 A1* | 11/2006 | Smith | 370/412 |
| 2006/0272019 A1* | 11/2006 | Addepalli | 726/23 |
| 2007/0011741 A1* | 1/2007 | Robert et al. | 726/22 |
| 2007/0038857 A1* | 2/2007 | Gosnell | 713/165 |
| 2007/0039051 A1* | 2/2007 | Duthie et al. | 726/22 |
| 2007/0160062 A1* | 7/2007 | Morishita et al. | 370/395.31 |
| 2007/0169184 A1* | 7/2007 | Krywaniuk | 726/11 |
| 2007/0248084 A1* | 10/2007 | Whitehead | 370/389 |
| 2008/0189784 A1* | 8/2008 | Mangione-Smith et al. | 726/23 |
| 2010/0281051 A1* | 11/2010 | Sheffi et al. | 707/770 |

FOREIGN PATENT DOCUMENTS

| | | |
|---|---|---|
| GB | 2 417 655 A | 3/2006 |
| WO | WO 03/010670 A1 | 2/2003 |
| WO | WO 2004/038594 A1 | 5/2004 |
| WO | WO 2004038594 A1 * | 5/2004 |
| WO | WO 2006/030227 A1 | 3/2006 |

* cited by examiner

METHOD AND APPARATUS FOR PROVIDING NETWORK SECURITY

FIELD OF THE INVENTION

The present invention relates to network security. In particular, the present invention relates to an apparatus and method of providing high-throughput anti-virus (AV) services to a large number of subscribers.

BACKGROUND TO THE INVENTION

There are many proven AV scanners in use today, and these scanners have gained considerable market acceptance for use in desktop, file server and gateway applications. Customers are able to rely on independent information and advice to select a scanner vendor, and then trust that vendor's product to reliably detect malware.

However, while the performance of these scanners is acceptable for desktop, server and gateway usage, it is not sufficient for use in high speed network infrastructures such as the core of the internet. The production of a new, high performance scanner presents not only technical difficulties but also issues of market acceptance (users are understandably unwilling to rely on untried products for their security). As such, it is advantageous to develop a solution incorporating existing scanners in such a manner that the overall performance of the solution is sufficient for deployment in these high speed network infrastructures.

It is known to use existing third party scanners within network applications. For example, organisations known as Managed Security Service Providers (MSSPs) offer services such as scanning all e-mail that passes through a subscriber's internet connection for viruses. Typically, this is done by diverting customer traffic through the MSSP's site. The traffic is then scanned by conventional software running on conventional personal computers (PCs). However, to scale the scanner performance to the required levels of both high throughput and low latency, it is often necessary to deploy of a large number of PCs operating scanners. Where this number of PCs grows large, the amount of external infrastructure such as switches and load balancers required to coordinate the system also increases. This results in both expense and unreliability.

Typically, in such an installation the large number of PCs all operate the same set of tasks. These tasks include:
- receiving and transmitting data into and out of the PC;
- decoding and operating the protocols that carry this data;
- copying this decoded data to the computer's main memory or disk;
- invoking one or more AV scanners;
- sending the data to one or more AV scanners;
- undertaking the scanning tasks such as decompression, content decode, signature matching, heuristics analysis;
- processing the results from the scanners;
- transmitting the data (if not infected), or an alternative to it (if infected), onto the intended destination; and,
- finally collecting and storing any statistics or other logging information on the tasks undertaken.

As such, the scanner on each PC receives data regardless of the type or level of threat from the content. However, the threat level depends on the application being used (e.g. web browsing, e-mail, peer to peer (P2P)) and the program being used to operate the application (for example, the Internet Explorer web browser). These factors are discussed further below:
- the application for which the content is intended: there are numerous types of malware in existence today ranging from mass-mailers to Trojans. However some of these threats are specific to certain applications, such that they can only be propagated and become active through a single application but no other; for example a mass mailing virus cannot be picked up and propagated through web browsing;
- the program by which the content is used: in addition to traditional forms of files based malware such as viruses, Trojans, worms etc., there exist a number of vulnerabilities in the programs (such as web browsers) that operate applications, and these vulnerabilities may be exploited by specially crafted pieces of content. These vulnerabilities are specific to each program. As such, a vulnerability in one program used as a web browser will not exist in a second program used as an e-mail client.

In addition to the above, the type of content being supplied will have a bearing on the threat level. In this context, content will broadly fall into two categories, executable and non-executable. Executable content poses a significantly higher threat. Executable content is able, once executed, to gain control of a computer and subsequently can then execute any payload it chooses (for example, it could delete the contents of a hard drive). Moreover, executable content can come in many forms and can use complex techniques to disguise itself (such as encryption and metamorphism). In contrast, non-executable content can only pose a threat by exploiting vulnerabilities in the programs which use the content. As a result, the content cannot take variable forms since it exploits static vulnerabilities; consequently threats due to non-executable content are often easier to detect than those due to executable content.

SUMMARY OF THE INVENTION

According to a first aspect of the present invention, there is provided a network security apparatus, comprising: one or more network traffic processors adapted to receive network traffic and to extract a data stream from the network traffic; content processing means adapted to inspect content in the data stream and thereby to establish a threat profile for the content; and, a heterogeneous array of scanners, wherein content is scanned by one or more of the scanners, the one or more scanners being selected in dependence on the threat profile.

According to a second aspect of the present invention, there is provided a method for providing network security, comprising the steps of: extracting a data stream from network traffic; inspecting content in the data stream and thereby establishing a threat profile for the content; and, scanning the content with one or more of a heterogeneous array of scanners, the scanners being selected in dependence on the threat profile.

The heterogeneous array of scanners comprises a number of different types of scanner. Each scanner type may have particular utility relative to other types for a particular threat profile that exists for certain content. Preferably, the threat profile depends upon at least one of: an application for which the content is intended, a program by which the content is used, and a content type. The scanners may be conventional software scanners designed to operate on conventional PCs or may be dedicated hardware units (such as components optimised for high speed pattern matching). By ensuring that content is sent to an appropriate scanner, the present invention takes advantage of the fact that different content has differing threat profiles, for example:

when web is the application a subscriber will not be exposed to mass mailing viruses, but is much more likely to be exposed to Trojans which masquerade as legitimate files or programs; and, when using a program to perform an application there will typically be a set of vulnerabilities in that program which may be exploited by malware writers, and by definition these vulnerabilities are unique to the program being used; for example, a vulnerability in an given e-mail reader will not exist in an image viewer, or indeed in a different e-mail reader, as the program is not the same.

In view of the various levels and type of threat that exist, the invention operates a number of different scanners where each scanner is designed to scan for one or more of the following:

specific pieces of non-executable content (e.g. images);

specific threats against applications or programs (e.g. exploits of a specific web browser);

specific pieces of executable content which are apparent for an application (e.g. adware/spyware);

specific pieces of executable content which are requested by a specific application (e.g. script in web content).

Advantageously, the use of conventional scanners allows the present invention to deal with content that is deemed to be unusual, unknown or suspicious under accepted (and trusted) practices. Preferably, a plurality of different conventional scanners are employed and their use is optimised in the following way. First, it is determined which content types are scanned fastest by each scanner type (e.g. Scanner A is fast at scanning executable files, and scanner B is fast at scanning text based documents). The invention then keeps a mapping of file type to scanner efficiency, and after the type each piece of content is identified it is then sent to the scanners that are most suitable for that type of content, thereby reducing the overall workload on the scanners as they do not deal with types of content to which they are not suited. As such, it is preferable that the invention incorporates scanners that compliment each other and cover all content types.

Multiple scanners may be used on a single content stream. In such circumstances, when one scanner produces a result the other parallel scans may be terminated. This can be configured to occur when the result is positive (i.e. infected) or negative (i.e. clean).

BRIEF DESCRIPTION OF THE DRAWINGS

An example of the present invention will now be described in detail with reference to the accompanying drawings, in which.

DETAILED DESCRIPTION

As will be clear to one skilled in the art, the present invention may be implemented on a number of platforms (including a conventional PC). However, the preferred embodiment of the present invention exploits the capabilities of a dedicated hardware analysis device such as the Content Security Gateway (CSG) devices described in the Applicant's co-pending British patent application nos. 0523739.1 and 0522862.2. The CSG is capable of simultaneous performance of a number of content processing services on data sent and received by a large number of subscribers. These services include Anti-Virus (AV) capability and a variety of other content processing options (such as Anti-Spam and Anti-Phishing). Each service may be customised for each subscriber (for example, a subscriber may not have signed up for anti-spam or may specifically request that web pages are not checked for phishing).

Figure 1:
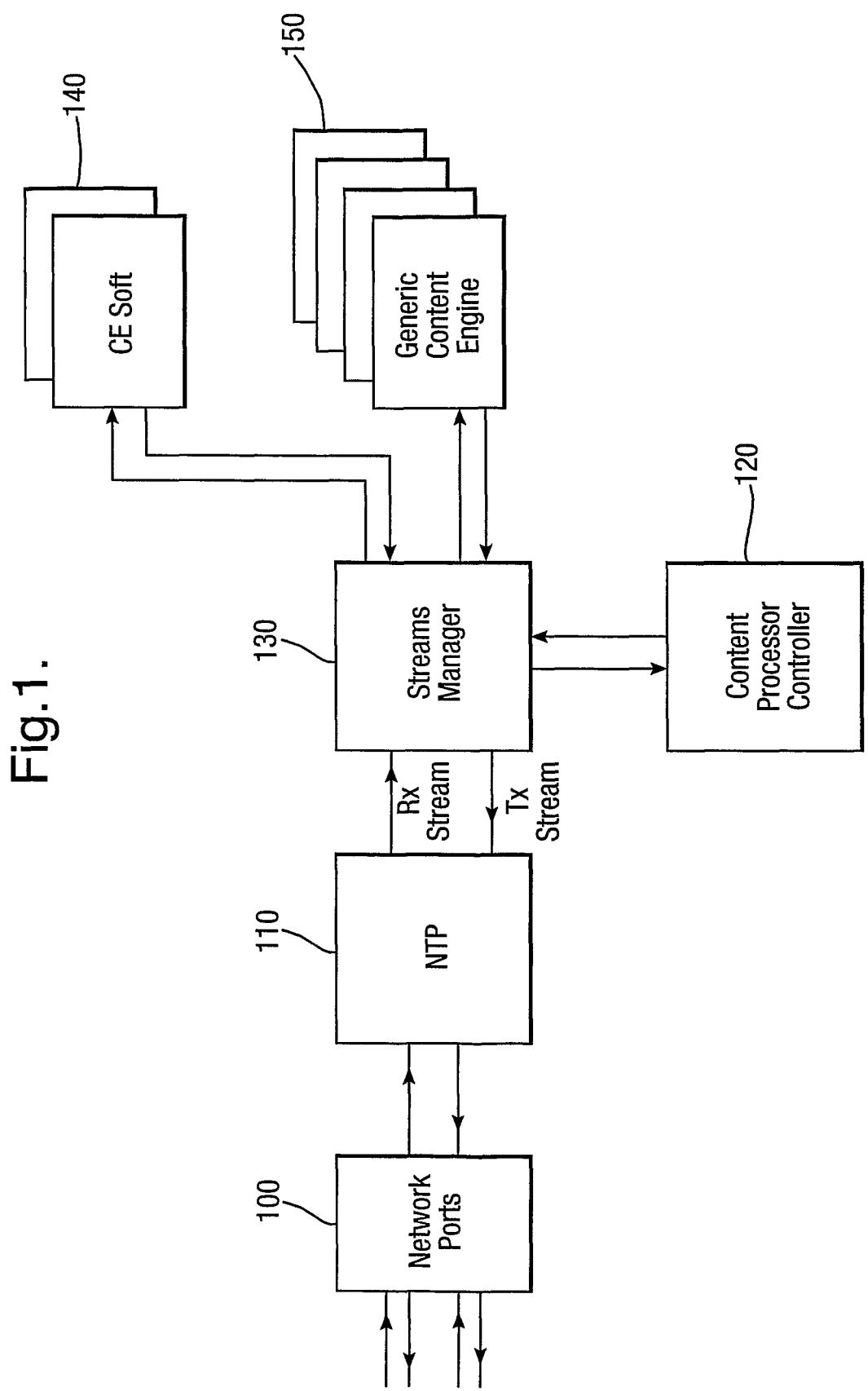
FIG. 1 is a simplified schematic representation of a Content Security Gateway (CSG)

FIG. 1 shows a broad schematic outline of the composition of an example of a CSG. Network Ports 100 receive data packets from any type of network. Network Traffic Processor 110 then identifies the transport protocol (such as TCP) used by the data, and extracts the payload from each data packet and combines it with others in the same communication to yield a data stream. By extracting the payload in this way, a continuous flow of content (the data stream) is provided to the rest of the CSG, allowing content level processing of the traffic. In this way, a full piece of content (which may have been spread across a number of network data packets) may be analysed by the CSG.

The CSG terminates TCP connections locally within itself. This means that instead of a TCP connection forming end-to-end between the subscriber machine and a destination machine, one connection forms between the subscriber and the CSG, and a second forms between the CSG and the destination machine. When a new flow using TCP is detected, and the CSG determines it belongs to a subscriber, at this point the two connections are set-up. Note, the session layer protocol (e.g. HTTP) is still end-to-end, although the CSG may manipulate information passed over this session. The CSG may operate the TCP termination in the manner of a conventional network proxy (e.g. each connection utilises distinct network and link layer addresses), or in a transparent manner such that these link layer and network layer addresses are identical on the pair of TCP connections.

The same "transparent" approach is used for UDP and other protocols.

The termination of these TCP connections permits the CSG to modify content as it passes between end-points, ensuring that any changes to the content made by the CSG do not cause communication problems. If the TCP connections were still end to end, as the CSG modifies the content, the acknowledgement functionality of TCP would cause problems, as the information sent by one party would be different to that received by the other (as the CSG has modified it), causing the session to fail and be aborted by the devices.

It should be recognised that the data stream, while continuous, will contain discrete pieces of content to be processed. For example, each file within the stream may be treated as a separate piece of content.

The data stream is then passed to a Streams Manager 130. Further information may also be passed to the Streams Manager 130, such as: a stream ID, a subscriber ID, network layer source and destination address, a policy for the stream including which services are to be operated (for example, AV service enabled), and the configuration of the or each selected service (for example, instructions to scan all traffic or block certain types of applications). The Content Processor Controller (CPC) 120 is also illustrated in FIG. 1. The CPC 120 collates results from the services performed by the CSG and effects the ultimate decision as to whether to block or allow the subscriber's access to the data.

The CSG contains a number of content engines. The content engines may broadly be categorized either as hardware content engines 150 or software content engines 140. In this particular embodiment, the hardware content engines are Generic Content Engines (GCEs) 150 optimised to perform various content processing tasks. An example of a GCE 150 is described in Applicant's co-pending British patent application no. 0522862.2. The GCEs are extremely fast at performing the tasks for which they are designed. The software content engines 140, referred to hereinafter as CESofts, may comprise conventional computer platforms capable of operating conventional software (such as a conventional AV scanner). It should be recognised that each CESoft 140 provides a flexible option and that the tasks undertaken by the GCEs 150 in the following description could also be undertaken by one or more CESofts 140.

Figure 2:
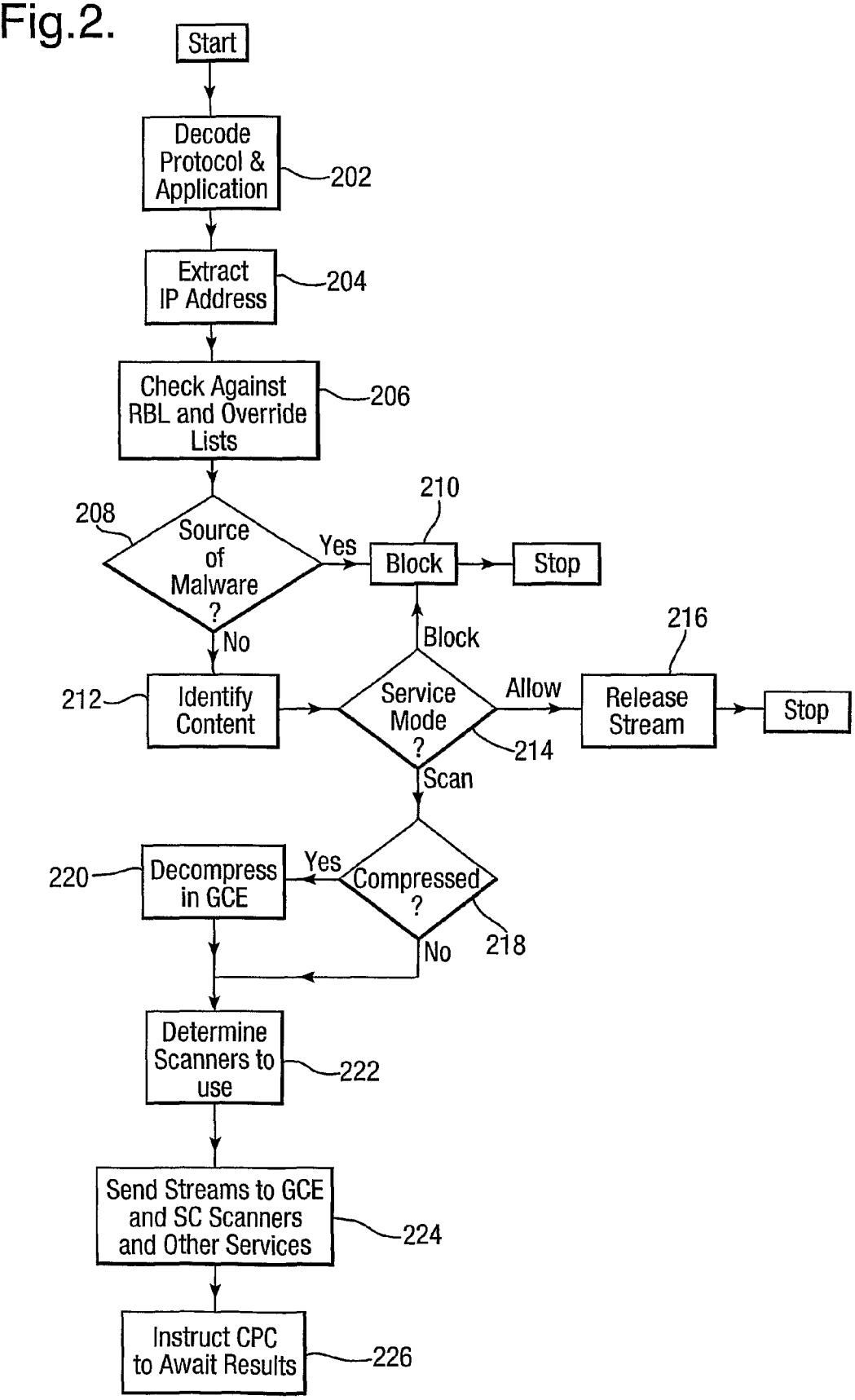
FIG. 2 is a flow diagram illustrating processing steps taken in accordance with one embodiment of the present invention.

When the Streams Manager 130 receives a new stream it passes it to the appropriate GCE (or GCEs) 150 to identify the data protocol used (for example, HTTP, SMTP, P2P) and to decode the identified protocol (step 202 in FIG. 2). This identifies the application for which the network traffic is intended (such as web browsing or e-mail). During this decode the program used by the application will be identified if such an identifier exists in the stream. For example, HTTP streams usually contain a 'User Agent Field' that indicates which program generated the stream (such as a specific web browser or an update utility such as WindowsUpdate Manager).

In the case of SMTP (for example), the protocol decode will also yield the IP addresses of the source of the information (step 204 in FIG. 2). This source information, along with the source IP addresses extracted by the NTP are then sent to the CPC 120 by the GCEs 150 (via the Streams Manager) and used in a check against a number of Realtime Blacklists (RBLs) (step 206) to determine if the stream originates from a source deemed to issue malware or inappropriate content (step 208). If the source is suspected of issuing such content then the stream is blocked (step 210), and no further work is undertaken on this stream (thereby eliminating an unnecessary load on the AV scanners). Additionally, the CPC 120 contains some defined override lists that can be set to ensure the stream is always propagated, or always blocked, again ensuring no unnecessary load is placed on the AV scanners. These override lists can be specified down to a per subscriber level.

If the stream is not deemed to originate from a malware or inappropriate content source then it is operated on further by the GCEs 150 in order to identify what type of content, if any, is being carried in the stream (step 212). The GCEs 150 then perform a lookup if this content type against the service settings. The service settings indicate a service mode for the content type, the result of which is that traffic is allowed, blocked or scanned (step 214). If the result is:

Allow: the stream is then released onto its destination (step 216);
Block: the CPC is informed and the CPC then blocks the stream (step 210);
Scan: the content must be sent to one or more appropriate scanners based on the content type, application (as indicated by the protocol), and program.

When a stream is blocked from reaching a subscriber various other actions may occur, and these may be in dependence on the subscriber's preferences. For example, a block page may be transmitted to a subscriber when HTTP data is blocked.

If the service mode is scan, then the GCEs continue to process the stream in order to capture the piece of content (for example a file or web page). Whilst capturing the content, hereinafter referred to as the derived stream, the GCEs also calculate a digest of the content. Moreover, if the content type is compressed (step 218), and the compression format is one the GCE can decompress, the GCE then decompresses the content (step 220) yielding a new stream bearing the decompressed form of the content.

At this juncture in processing the following information about the stream is now available to the present invention:
protocol type (indicating the application for which the content is intended);
content type (in particular whether the content is executable); and,
program type (such as a specific web browser or utility).

This information allows a threat profile for the content to be established. The present invention makes optimal use of the resources available to it by using the threat profile to send the stream and/or content to the most appropriate scanner available. In the preferred embodiment, the scanners to be used are determined by means of a simple algorithm (step 222). This algorithm is not fixed and may vary over time as the number and type of scanners vary, but an example is shown here below:

1) Look up the content type in a table. If the file is of the type 'image' then send to an Image Scanner to be scanned.
2) If the content type is ASCII or HTML and does not contain active content (such as scripts or specific HTML tags), and is carried over SMTP protocol, then send to an anti-spam service for checking.
3) If the content is executable and is carried over HTTP then send to a Web Threat Scanner.
4) If the content is script based and is destined for a known web application carried over HTTP then send to a Web Script Scanner.
5) If the program used is known then send to the scanner which checks for exploits (vulnerabilities) of this program.
6) If the content has no active parts, and the application is web browsing, then send to an anti-phishing service.

This scanner selection algorithm is usually implemented by a simple lookup in a database using tuples of protocol, content and program where each can be wildcarded. The result of the algorithm indicates which scanners are to be used, and whether they operate on the stream, the content (derived stream) or decompressed content (derived stream), and these streams and scanner instructions are then sent to the relevant AV scanners.

The GCE now sends the stream and scanner instructions to the relevant scanners (step 224). The scanners are implemented both in hardware on the GCEs and in software on a general use platform using standard PC components (such as a CESoft 150) that accepts industry standard software. A piece of software, known hereinafter as the Scanner Controller (SC), allows a plurality of software scanners to appear as one. If the stream is sent both to the SC and to hardware GCE scanners then the CPC is instructed to await results from both sets of scanners before data is finally blocked or released to reach the subscriber (step 226).

Similarly, if stream is also scheduled to be processed by other services (as well as the Anti-Virus Service), such as the Anti-Spam Service or Anti-Phishing Service then the CPC is informed of this activity so that a release decision is not made before the results of all the separate scheduled processes can be combined. However, note that early block decisions can be made if a single result requires a block. In such a situation incomplete tasks may be terminated immediately.

The presence of multiple GCEs in the invention allows the tasks of decompression and digest calculation to be performed in parallel. Similarly the multiple GCEs permit pipelining such that multiple streams can be processed in parallel.

The SC and GCE scanners then return to the CPC the results form the scanners used on the content, and the CPC then releases or blocks the content accordingly.

Scanners that may be used in accordance with the present invention include:

Image Scanner: images are non executable content which can only form malware if they contain an exploit crafted for a specific vulnerability in an application. The number of these vulnerabilities is small (measured in tens and perhaps hundreds) and the exploit must be of a fixed (i.e not polymorphic or metamorphic) nature. As a result, the image scanner is typically implemented in accelerated hardware optimised for pattern matching, or in a targeted software pattern matching scanner. In the case of software the size of the pattern database is minimised in order to increase speed;

Web Script Scanner: where a specific program is running, such as Internet Explorer, it can execute content within the defined limits of its architecture of this program (e.g. Java Security Architecture). This scanner is designed solely to detect this executable content type that is relevant to this controlled security environment.

Web Threat Scanner: this is a conventional third party industry scanner, where this scanner is only configured to deal with threats residing on the web such as adware, spyware Trojans etc. This scanner has less work to do and therefore operates faster than conventional scanners in their normal mode.

Web Browsing Program Scanner: a program such as Internet Explorer has a number of vulnerabilities that are unique to that program, and this scanner is designed solely to protect against such threats. Again these threats are typically static and simple hence this scanner is typically a fast pattern matcher Spoofing Scanner: a piece of malware may attempt to masquerade as another legitimate program in order to avoid detection. A spoofing scanner dedicated to validating that the stream data of an identified program is in fact being generated by that program may therefore be included in the present invention.

E-mail Application Scanner: an application such as e-mail has a number of vulnerabilities that are unique to that application, and this scanner is designed solely to protect against such threats. Again these threats are typically static and simple hence this scanner is typically a fast pattern matcher. In this case it is not always possible to identify the particular e-mail program in use (e.g. Microsoft Exchange Server) so the threats for all e-mail program may be combined together in a single scanner.

Instant Messaging Application Scanner: an application such as IM has a number of vulnerabilities that are unique to that application, and this scanner is designed solely to protect against such threats. Again these threats are typically static and simple hence this scanner is typically a fast pattern matcher.

Conventional industry scanner: this scanner is used in exceptional conditions where a piece of content, stream or application is unknown, unusual or suspicious. These scanners may be obtained from well known third party organisations such as Symantec, Kapersky, and FRISK.

Figure 3:
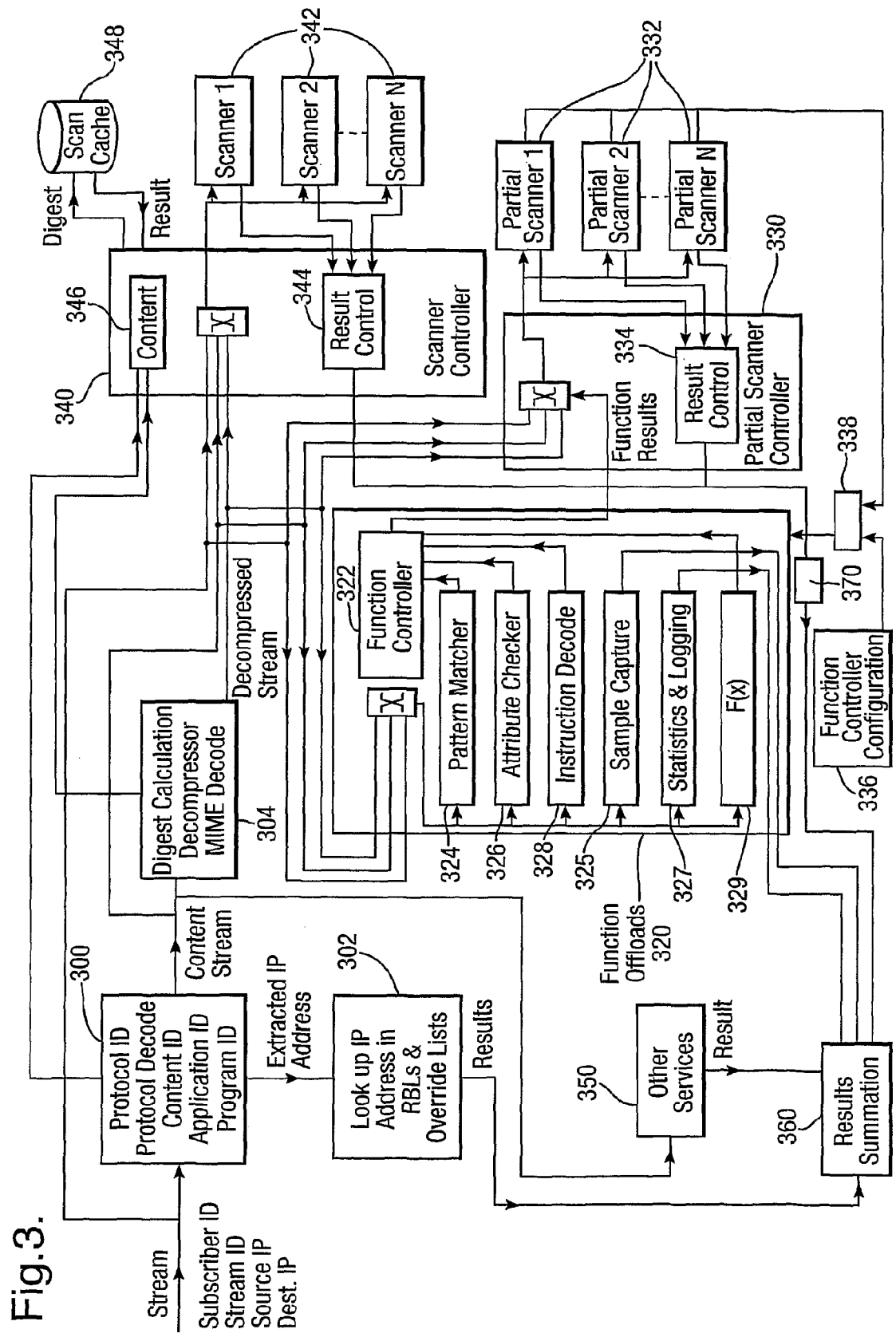
FIG. 3 illustrates function offloading and digest calculation according to a preferred embodiment of the present invention; and, FIG. 4 illustrates the components upon which processing functions are executed in a preferred embodiment of the present invention.

As stated previously, the scanners implemented in software are resident on a platform using standard PC components such that they accept industry standard software. Though this has the benefit of allowing known, established, and trusted AV scanners to be incorporated in the present invention, performance is consequently limited by the platform itself (no pipelining or parallelism in the hardware) and the software (which is not designed for high throughput). These scanners are grouped together to provide a single interface to the system, and made to appear as a single scanner by a software module known as the Scanner Controller (SC). FIG. 3 illustrates the SC 340, which coordinates a number of scanners 342 and incorporates a result content store 344 to combine the results of the various scanners 342.

Other scanners may be introduced as and when needed for the mode of use of the invention. For example, if the invention is deployed in an environment where FTP traffic is prevalent then a scanner specifically designed for FTP may be included. Similarly, if the content being passed through the CSG features a large degree of content of a particular type then a specific scanner for that type of content is introduced (for example, if music downloads are common then a scanner which scans this type of content for known exploits may be introduced).

As would be clear to one skilled in the art, specialised scanners of this type may be implemented in a number of ways. For example, they could take the form of conventional third party scanners with limited configuration pattern matching databases. Alternatively, it is possible that the scanners will be developed specifically for use in the context of the present invention.

In order to reduce the load on the platform running software AV scanners, the other services (such as anti-spam and anti-phishing) are operated on separate platforms.

The scanners are selected so that their performance and characteristics complement each other. For example, conventional scanners are relatively good (i.e. fast) at scanning large pieces of content, and relatively poor (i.e. slow) at scanning small pieces of content (due to the overhead of opening a file). However, web browsing includes many very small image files. To counter this, a specialised image scanner (as described above) may be incorporated into the invention. As images provide a low threat profile such a scanner is relatively easy to implement. In addition, conventional AV scanners can also be slow at scanning text files, and for this reason a specialised web script scanner may be incorporated (along with the additional anti-spam and anti-phishing services).

The present invention is also capable of improving performance by offloading tasks typically done by conventional AV scanners to dedicated hardware units. For example, as mentioned above, the GCEs may decompress the data before it is sent to a scanner.

Figure 4:
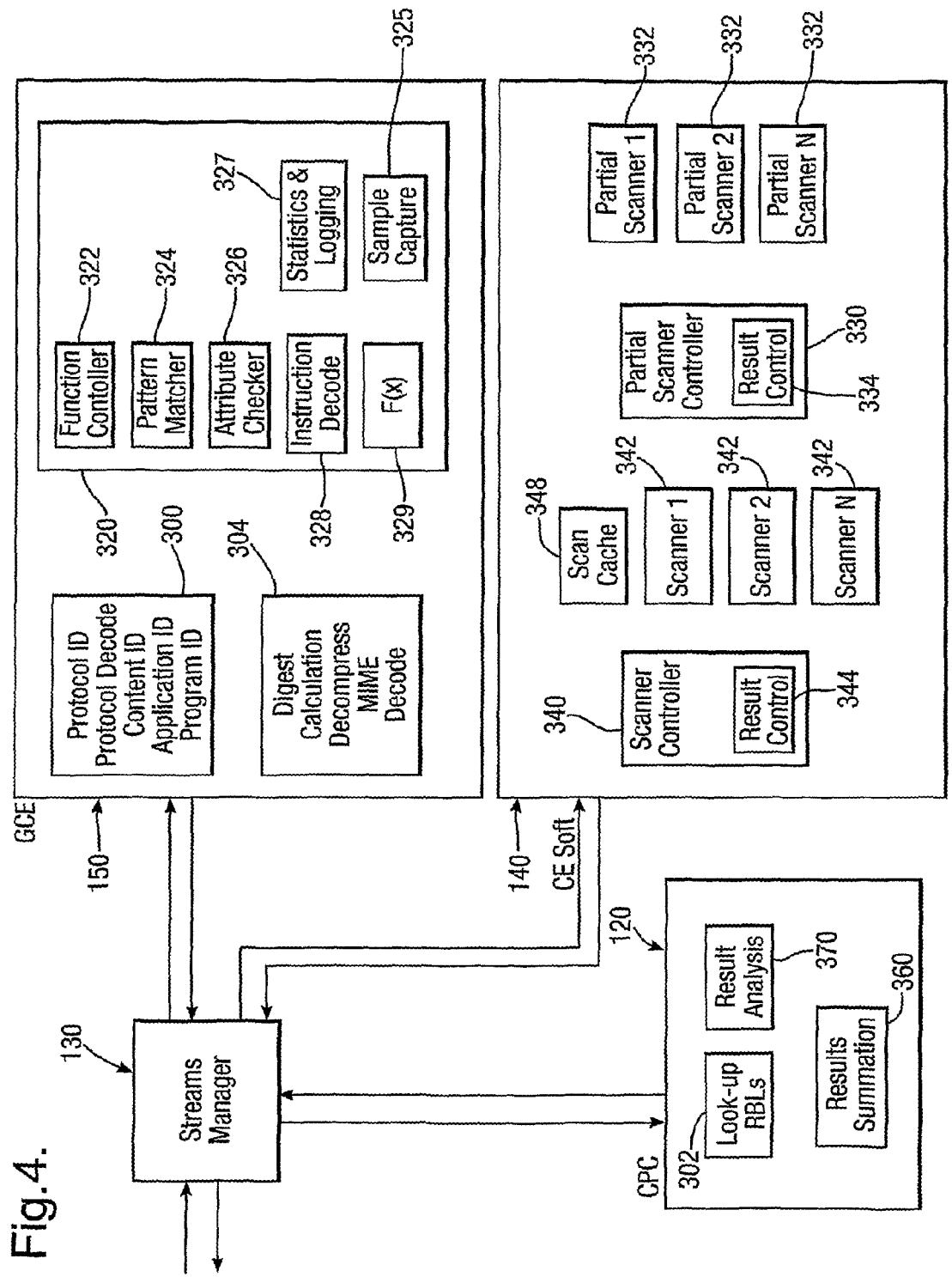

FIG. 3 conceptually illustrates the flow of a data stream through the CSG and in particular shows the way in which functions are offloaded from the conventional scanners. FIG. 4 shows which components of the CSG host the various tasks illustrated in FIG. 3.

As detailed previously, once a stream is received from the NTP, the content, program, and protocol type of the stream is identified, and the protocol is decoded 300. A preliminary check 302 of the IP address against block and override lists is made to ensure that further processing is required. The content stream is then decompressed (if required) and a digest is calculated 304.

In addition to decompression, a number of further compute intensive functions may be performed before the derived stream is passed to the scanners. The functions available are typically implemented as dedicated hardware blocks in a GCE, where these functions can be programmed in for each available combination of protocol (i.e. application), content and program. Preferably, the scanners are aware that these functions have been offloaded so as to ensure that the scanners do not unnecessarily repeat these tasks. Since the offloaded functions are performed on high performance hardware and software building blocks and the scanner is no longer required to perform these tasks, overall performance is significantly improved.

A non-exhaustive list of possible function offloads 320 includes:

Pattern Matcher (PM) 324: the PM is programmed with a set of patterns which are searched for across the stream/derived stream/content, and a set of results indicating the following are returned: number of matches, offsets in stream where found. The patterns are defined as per conventional Regular Expression matcher found in the PERL language and are of the same format, or similar industry standard pattern matching languages.

Attribute Checker 326: this function checks each content stream for a series of attributes against a set of defined thresholds. For example, the size and format of the file header may be checked. The function may also check for a number of attributes across all streams, again checking against defined thresholds.

Instruction Decoder 328: where the content identification check performed indicates the file is for a specific hardware platform (e.g. Windows executable) this function then performs a count of each instruction found within the data and code segments of the file, and checks the densities of these values across the file. The decoder will then report any unusual results, which may include the most commonly used op-codes or byte values (particularly if their density exceeds any threshold values) and also any sudden change in density of such features.

The above is not an exhaustive list, and a number of other functions 329 could be offloaded in accordance with the present invention. For example, a Statistics and Logging function offload 327 may be included (storing such details as the most frequently occurring viruses, the source of most viruses, and the type of viruses being scanned). Similarly, a Sample Capture function offload 325 may also be utilised, allowing samples of viruses to be collected (without imposing a processing burden on the partial scanners) for subsequent further analysis.

The function controller 322 coordinates the actions of the various function offloads. In particular, note that a particular result of one function may cause the function controller 322 to call another function. The function controller is programmed to forward the results of the various functions, and the streams on which they operate, to one or more partial scanners 332, coordinated by a Partial Scanner Controller (PSC) 330. The manner in which the functions are utilised is configured through a programmable interface (API) 338. The API 338 is used to configure parameters for each function, the outputs each function generates, and how the function controller 322 should process these outputs. For example, the API 338 may be used to specify that if the Pattern Matcher 324 detects a match of a certain type, then a certain portion of the streamed content is sent to the Instruction Decode 328 function, or that a portion of the streamed content is sent to a defined partial scanner 332. This configuration information is stored on a user-defined function controller configuration 336. The partial scanners may also have access to the API. For example, after acting on streams and results received from the function offloads, the Partial Scanner 332 may then request, through the API, that further functions are executed. Moreover, the Partial Scanner 332 may be able to control the manner in which they are executed by passing parameters to the Function Controller so that the function is operated and returns results in a defined manner. The PSC 330 operates in a manner analogous to the mode of operation of the 340, including partial scanners 332 in the place of scanners 342, as well as a result content store 334. The partial scanners 332 are adapted to interpret the results of the offloaded functions. Examples of such partial scanners include:

PM scanners: such scanners use pattern matching regularly and the results of the searches are presented to the scanners; the scanner simply uses these results as an indication of infection, and if no infection is present the scanner then moves on to undertake its remaining checks;

Heuristics based scanners: such scanners use the presence of certain attributes to determine whether content is malicious. In this case the Attribute Checker function has checked for the presence of these attributes in advance and returned a result summary to the heuristics engine simply to interpret these results;

Instruction Distribution Scanners: such scanners utilise these checks to look for anomalies in code which may indicate presence of 'foreign' code (i.e. a virus) in a file.

The partial scanners may be implemented by configuration of conventional scanners to operate with the function offloads. For example, a conventional scanner may be compiled with a pattern database containing only a single entry. In this case, the pattern matching function offload performs the pattern search and the results are passed to the PSC. The partial scanner then undertakes a further (redundant) pattern search, but this runs quickly due to the small size of the pattern database. The partial scanner then performs the scanning functions for which no function offload is available. Alternatively, the partial scanner may comprise a conventional scanner adapted not to use its pattern search engine.

In one example, a partial scanner is compiled without various modules such as the scanning of image files. Accordingly, image files are not sent to this partial scanner and as such the partial scanner need not undertake a full range of functions.

In another example a partial scanner is designed to operate specifically with a Function Offload such as the pattern matcher 324. The pattern matcher 324 will generate a set of results indicating that it has detected a number of patterns at specific locations within the streamed content, therefore allowing the partial scanner 332 to analyse the parts of the content identified by the pattern matcher. In this manner the partial scanner and pattern matcher provide parallelism, thereby increasing the throughput of the overall scan operation.

In combination, the partial scanners and the various offloaded functions essentially provide different elements of a single overall AV scanner providing a defence against all types of malware. Each element performs one or more of the AV techniques required to offer this comprehensive service. The combination of a distributed set of partial scanners each with a specific purpose where each has its compute intense function offloaded that provides the overall high throughput of the scanner.

As shown in FIG. 3, the results of the partial scanners are collated by the PSC. The results are then combined 360 with those of any other services 350 and the CPC takes action (for example, blocking or allowing data) accordingly. FIG. 4 shows that results analysis 370 also occurs at the CPC.

FIG. 3 also illustrates the creation one or more digests of the content stream before the stream is passed to any service (including AV) for action. The digest acts as a unique identifier, or fingerprint, for the content. It may be used to identify content that has previously been scanned (for example, as part of a separate transmission), and consequently to prevent unnecessary repetition of a task that has already been performed.

FIG. 3 illustrates the use of digest in combination with an SC 340. One skilled in the art will readily understand that the principles of this use may equally be applied to a PSC or, indeed, to other services (such as Anti-Spam or Anti-Phishing). As illustrated in FIG. 3, the digest is first calculated and then transferred to the SC 340, which contains means 346 to receive the content. The SSC 340 operates a cache 348 of scanned pieces of content, storing the result of each scan within the cache 348. The cache 348 is indexed by the digest of the content. Note the cache 348 is flushed or cleared each time the scanner signatures or definitions are updated.

When a piece of content arrives at the SC, the SC first looks up the content digest in the cache. If the entry is not present then the SC 'connects' this stream to the appropriate scanner(s), and returns the result(s) to the CPC. The digest entry is then added to the cache with this scan result.

If, on the other hand, the digest has been previously stored then the SC takes the cache results and returns these result(s) to the CPC without undertaking a scan.

It is important to bear in mind that multiple digests may be created for a given piece of content. That is, digests mat be calculated for one or more segments of a larger piece of content. In particular, digests may be updated as additional data is received. The choice whether to use each of these multiple digests may be static (i.e. always or never) or selected on the basis of application type. For example, the application WindowsUpdate transmits large pieces of invariant content to millions of users, and it may therefore be beneficial to recognise the content at the earliest available stage, thereby reducing unnecessary load on the resources of the CSG. As such, a digest calculated on the basis of an initial content segment may be deemed appropriate for this application. Note, when using partial digests there are multiple results supplied to the SC at each juncture when a digest is available, and the stream available up to that point is also sent to the SC.

The advantages of calculating digests not only on an entire piece of content but also on segments of the content are also apparent when the content does contain malware. Consider the case where a user attempts to download a large file and a virus is only discovered in that file once the majority of the file has been transferred to the user. At this point, the CSG will prevent transfer of the remainder of the file. However, if the user were to attempt to re-start the download then only the last section of the file would be requested. This can only be recognised if a digest had been calculated on that segment of the content.

Analysis of content segments also proves valuable in, for example, the context of download managers or peer-to-peer file sharing. In these cases, a single large piece of content is downloaded in segments from a variety of sources. In this case, each data stream will only contain segments of the content. Typically, a virus scanner cannot perform without access to the entire piece of content, and there is therefore no reason to scan the segments individually and the present invention will therefore not pass the content segments to the virus scanner. There may be exceptions to this rule, where certain segments can be scanned (for instance, the start and the end of the file may betray the presence of a virus) and the present invention may therefore be adapted to identify certain segments from a piece of content and pass these on to the virus scanners. In the case of HTTP, the segments may be identified through use of the HTTP protocol Methods.

The digest is dependent upon the source of the content. The source may be defined as, for example, the IP address, the domain or the URL and digests may be calculated for each definition of source that is adopted. This provides a number of advantages. For example, it is theoretically possible to introduce malware to a piece of content in such a way that a digest calculated for it is not affected. A hacker may try to exploit this by altering content that has been previously scanned in this way since content having a known digest is not scanned. However, if the digest also depends upon the source of the content then this evasion technique will not prevent the content being scanned, as the content will now originate from a different source (i.e. the hacker's website rather than the original source).

There is a small probability that the digests of two unrelated pieces of content will be identical, due to the manner in which digests are calculated. In order to overcome this problem the present invention may calculate more than one digest for any given piece of content (or content segment), with each of these digests being calculated using a different digest calculation algorithm. For example, digests may be calculated using both MD5 and SHA-1.

A source-dependent digest also finds particular utility in the context of content segments. As mentioned above, different segments of a single piece of content are often downloaded from a variety of sources. A scan on each individual segment may not be enough to identify malware, so a scan on the entire piece of content is preferably performed. If the content in its entirety is found not to contain a virus this does not necessarily indicate that each segment is virus-free, as some segments may have originated from an infected version of the content while others did not. It is therefore necessary to scan the entire piece of content from a single source to establish that each content segment from that source is not infected. Digests that are dependent on the source are able to indicate whether or not content segments originate from a source for which the entire piece of content has been found to be virus free. Once the entire content has been found to be virus free from a number of sources it is possible to download any segment from any of those sources, without the requirement for a scan. As such, a piece of content may still be obtained in segments originating at a number of different sources, thereby maintaining the advantage of Download Managers.

The digests calculated for a given source may only be valid for a limited period so that if content from that source is adapted to contain a virus then this is recognised. Moreover, if any content from a specific source is found to contain malware then the present invention may be adapted to invalidate all digests calculated for content from that source.

Certain content may only be allowed if its digest indicates that it originated from a trusted source. In this way, content can be identified and trusted both on the basis of its origin and on the basis of an earlier scan. In this way, certain pieces of content may be allowed only from certain sites (for example, a Microsoft update may only be allowed from an official Microsoft site).

For simple types of malware that replicate in such a manner that each copy of the malware is identical to all others (typically worms or Trojans) then the use of digests is an effective method to reduce traffic sent to the scanners; the invention processes many pieces of the malware which are identical and after performing a single scan the digest computed is then used to detect all further instances of this invariant piece of malware, which are not sent to the scanners. However, more complex forms of malware tend to vary each time they replicate. For example, mass-mailers spread by infecting a machine then reading the address book of the user logged onto the infected machine. New copies of the malware are then sent to recipients found in the address book (consequently each mail will be different as each address book is different). In addition to this, mass mailers will typically also change other fields inside the e-mail such as the subject line or phrases inside the e-mail body and the e-mails sent therefore differ each time the malware spreads. Moreover, any file sent in an e-mail carrying malware may vary in each replication through the use of polymorphic or metamorphic replication techniques used by malware writers. Therefore in such circumstances use of digests computed on the entirety of the e-mail or any attachment are not effective in reducing traffic sent to the scanners.

To counter the threat of variable malware, a number of detection-techniques may be adopted to identify and prevent the spread of such content.

For example, variable pattern matching techniques are known in the art. According to such techniques, a number of samples of particular malware may be collected as it spreads. A comparison of these samples will typically show some commonality between the different instances of the malware (for example, common words or phrases). As such, a pattern may be identified that indicates an instance of the malware. This pattern may be a simple word or phrase, or a combination of words or phrases (for example, word A, followed by a variable number of spaces, followed by word B, followed by a variable number of spaces followed by word C), and can be detected by conventional complex variable pattern matchers. An example of such a pattern matcher is the GCE described in Applicant's co-pending British patent application no. 0522862.2 which loads the patterns into a high speed hardware engine for high throughput detection of patterns. Other forms of high speed complex pattern matching are pieces of software running on general microprocessors, an example of which is the open source AV scanner CLAMAV which simply looks for the patterns it is loaded with; this CLAMAV pattern matcher running on a general purpose microprocessor is not as fast as the GCE hardware implementation but by limiting the pattern database used it still provides a performance benefit over a conventional scanner. In this case the pattern database is tailored to the highest traffic loads at any period of time. For example, only patterns for malware currently propagating the internet (known as active in the wild) are loaded into the database, as opposed to all malware patterns that have ever been known.

The present invention may also use traffic anomaly detection to identify outbreaks of malware. For example, a worm may propagate over the TCP protocol, and have an exceptionally high replication rate. Consequently, the levels of TCP traffic on certain TCP ports will increase dramatically in comparison with the usual amount of traffic on those TCP ports. As such, an effective method of identifying such malware is to compare the usual level of traffic on a defined TCP port against the level of traffic over a defined period of time. For example, if the average transfer rate for TCP over a port is 100 files per second over a 60 minute period, the content may be determined to be malware (and thus not sent to the scanners) if the detected rate is greater than N times this average rate (where N may be specified for each particular instance of malware). Similarly, packet rates can be compared and if deemed to be malware the content carried over those packets is not sent to the scanners. There are a number of further metrics that may be used in addition to simple traffic levels. For example, the number of instances of files sent of a certain size, or the rate at which TCP connections are opened and closed. With each metric the typical (or usual) traffic level is compared to the current traffic level.

In the alternative, the present invention may make use of traffic anomaly detection to identify large amounts of legitimate content that need not be scanned. For example, a large supermarket chain may send out a mass-email to its customers which is tailored to their shopping preferences. It is clearly disadvantageous to scan every one of these e-mails. For this reason, the present invention may analyse the traffic flow fo the source of the data, together with other attributes (for example, certain expressions in the content, the size of the content, and the use of certain TCP or UDP ports). Through a comparison of these details with the typical behaviour of each source, a judgment may be made as to whether it is necessary to scan the content or not.

Many pieces of content passing over the Internet, or other public networks, are in fact subtly different forms of the same piece of source content; examples are spam messages, which account for over 75% of all e-mail traffic, where the source of the spam messages wishes to send the same piece of content to as many recipients as possible, but changes each incarnation of the message being sent so as to subvert anti-spam filers operating in the network and at the recipients. The present invention may be arranged to combat such variable content by first operating a number of techniques which distil the content down into the 'core' content message (i.e. the characteristics that are invariant between each piece of content) that is being communicated, and then calculating a digest (referred to hereinafter as a 'variable digest') on this piece of core content. Accordingly, differing content may have the same variable digest as long as the selected core parts are invariant A number of techniques may be adopted to identify the invariant, core content upon which variable digests are calculated. In the case of a spam e-mail, these techniques may include the generation of MIME-decoded streams, HTML to ASCII conversion, and textual parsing (this step being performed with knowledge of how spam e-mails are constructed). For example, the open source anti-spam detection system Distributed Checksum Clearing (DCC) identifies parts of an e-mail thought to be invariant (by removing variable parts such as the intended recipients, the white space in content, and the non-renderable content) and these may be used to calculate a variable digest. Clearly, while the recipient address of a mass mailed spam e-mail is variable, certain other parts will be invariant (such as the purpose of the spam).

There are also image manipulation techniques that may be used to identify core content, and consequently to calculate variable digests. These include colour space techniques effective to remove colour and image re-sizing algorithms.

Variable digests may be calculated both on entire pieces of content and on content segments as required.

These variable digests will be used in combination with the fixed digests described earlier. The same approach can be used on parts of files (or attachments) that are thought to be invariant. Analysis of the latest malware trends is used to identify which parts of the content are likely to be invariant. The invariant parts could be, for example, the file header or the last 4 kbytes of the file. According to this technique, the digest calculation algorithm will vary over time. The variable digests will be able to detect malware and thus prevent content being unnecessarily passed to the scanners, thereby reducing the load on the scanners.

As with fixed digests, a number of variable digests may be calculated for each piece of content. Similarly, variable digests may be calculated for both the compressed and decompressed forms of the content, and may depend on the source address.

The use of the override lists and the blocking of certain application types also reduces scanner load. A further reduction is available by allowing subscribers to implement a policy defining types of content to be blocked for a given application. For example, the subscriber may specify that all executable files are to be blocked when using e-mail.

It may be that text-based content with no embedded active content (such as HTML with no active tags, or an ASCII text file) is not considered to be a virus threat. In this case, the stream is not acted upon by the Anti-Virus service at all but is instead passed to services that deal with, for example, social engineering attacks such as hoaxes or phishing. Since these other services are not performed on the same platform as the AV scanners, the workload on these scanners is reduced.

The invention claimed is:

1. A method for providing network security, comprising the steps of:
   receiving a plurality of packets of a communication, each packet having a header and payload;
   extracting the payload from each of the plurality of packets of the communication and combining the extracted payload from each of the plurality of packets into an aggregate content, the plurality of packets having an associated source and destination;
   identifying, with a content processing component, a type of content of the aggregate content to determine whether to scan the aggregate content;
   generating, in response to the determination whether to scan the aggregate content, a threat profile for the aggregate content, with the content processing component, by inspecting at least a sub-set of the aggregate content, the threat profile depending upon at least one of an application for which the at least a sub-set of the aggregate content is intended, a program by which the at least a sub-set of the aggregate content is used, the type of content and a protocol type employed by the at least a sub-set of the aggregate content, wherein the content processing component comprises a plurality of types of content engine, each being configured to perform one or more different content processing functions;
   calculating at least one digest of at least a portion of the aggregated content, wherein a number of calculated digests is based on an application for which the at least a portion of the aggregate content is intended;
   determining whether the at least a sub-set of the aggregate content has been previously scanned based on a comparison of the calculated at least one digest with digests stored in a storage device, wherein scan results are indexed by digests;
   scanning, in response to the determination whether to scan the aggregate content when the at least a sub-set of the aggregate content has not been previously scanned, the at least a sub-set of the aggregate content with one or more scanners of a heterogeneous array of scanners, the one or more scanners being selected in dependence on the threat profile;
   controlling, in response to the determination whether to scan the aggregate content, access to at least a part of the plurality of packets according to the results of scanning the at least a sub-set of the aggregate content by the selected one or more scanners;
   retrieving a scan result corresponding to the calculated at least one digest when the calculated digest is determined to match a stored digest; and
   controlling access to at least a part of the plurality of packets according to the retrieved scan result.

2. The method of claim 1, wherein the threat profile depends upon an application for which the at least a sub-set of the aggregate content is intended.

3. The method of claim 1, wherein one or more of the scanners are implemented in software.

4. The method of claim 1, wherein the threat profile depends upon a program by which the at least a sub-set of the aggregate content is used.

5. The method of claim 1, wherein the threat profile depends upon the type of content of the at least a sub-set of the aggregate content.

6. The method of claim 1, further comprising providing the plurality of packets to its associated destination by forming a transmission control protocol (TCP) connection with the destination after scanning.

7. The method of claim 1, wherein the at least one digest includes a plurality of digests.

8. The method of claim 7, wherein a digest is calculated for the entire aggregate content and at least one second digest is calculated for a portion of the aggregate content.

9. The method of claim 7, wherein each of the plurality of digests is calculated using a different calculation method.

10. The method of claim 7, wherein a digest is calculated for a first portion of the aggregate content and a second digest is calculated for a second portion of the aggregate content, and wherein the first portion and the second portion at least partially overlap.

11. The method of claim 1, wherein the calculation of the digest includes a source of the aggregate content along with the at least a portion of the aggregated content.

12. The method of claim 1, wherein the digest is calculated from a selectable portion of the aggregate content.

13. A network-implemented security apparatus, comprising:
   a network interface for receiving a plurality of packets of a communication passing over a network, each packet having a header and payload;
   one or more network traffic processors, linked to the network interface, configured to extract the payload from each of the plurality of packets of the communication and combine the extracted payload from each of the plurality of packets into an aggregate content, the plurality of packets having an associated source and an associated destination;
   a content processing component configured to identify a type of content of the aggregate content to determine whether to scan the aggregate content and to generate, in response to the determination whether to scan the aggregate content, a threat profile for the aggregate content by analyzing at least a sub-set of the aggregate content, the threat profile depending upon at least one of an application for which the at least a sub-set of the aggregate content is intended, a program by which the at least a sub-set of the aggregate content is used, the type of content and a protocol type employed by the at least a sub-set of the aggregate content;
   a digest calculator configured to calculate at least one digest of at least a portion of the aggregated content, wherein a number of calculated digests is based on an application for which the at least a portion of the aggregate content is intended;
   a scanner controller configured to determine whether the at least a sub-set of the aggregate content has been previously scanned based on a comparison of the calculated at least one digest with digests stored in a storage device, wherein scan results are indexed by digests and to retrieve a scan result corresponding to the calculated at least one digest when the calculated digest is determined to match a stored digest;

a heterogeneous array of scanners, each scanner being implemented in one of dedicated hardware and software instructions executed on a general purpose processor; and wherein the at least a sub-set of the aggregate content is scanned by one or more of the scanners in the heterogeneous array when the at least a sub-set of the aggregate content has not been previously scanned, the one or more scanners being selected in dependence on the threat profile, and wherein a controller is arranged to block, or to enable the forwarding of at least a part of the plurality of packets to the associated destination via the network interface, in dependence upon the results of scanning of the at least a sub-set of the aggregate content by the selected one or more scanners and control access to at least a part of the plurality of packets according to the retrieved scan result when the at least a sub-set of the aggregate content has been previously scanned;

wherein the content processing component comprises a plurality of types of content engines, each type being configured to perform one or more different content processing function.

14. The apparatus of claim 13, wherein one or more of the scanners are implemented in software.

15. The apparatus of claim 13, wherein the threat profile depends upon the program by which the at least a sub-set of the aggregate content is used.

16. The apparatus of claim 13, wherein the threat profile depends upon the associated type of the at least a sub-set of the aggregate content.

17. The apparatus of claim 13, wherein the threat profile depends upon the application for which the at least a sub-set of the aggregate content is intended.

18. The apparatus of claim 13, wherein the content processing component is further configured to provide scanning instructions to the selected one or more scanners.

19. The apparatus of claim 13, wherein a portion of the at least a sub-set of the aggregate content is scanned by a secondary scanner working in cooperation with the selected one or more scanners.

20. The apparatus of claim 13, wherein one of the plurality of content engines analyzes the at least a sub-set of the aggregate content using at least one dedicated hardware block.

* * * * *